(12) United States Patent
Holland

(10) Patent No.: US 7,036,039 B2
(45) Date of Patent: Apr. 25, 2006

(54) DISTRIBUTING MANAGER FAILURE-INDUCED WORKLOAD THROUGH THE USE OF A MANAGER-NAMING SCHEME

(75) Inventor: Mark C. Holland, Pittsburgh, PA (US)

(73) Assignee: Panasas, Inc., Pittsburgh, PA (US)

( * ) Notice: Subject to any disclaimer, the term of this patent is extended or adjusted under 35 U.S.C. 154(b) by 639 days.

(21) Appl. No.: 10/324,277

(22) Filed: Dec. 19, 2002

(65) Prior Publication Data
US 2004/0078633 A1    Apr. 22, 2004

Related U.S. Application Data

(60) Provisional application No. 60/372,031, filed on Apr. 12, 2002, provisional application No. 60/368,796, filed on Mar. 29, 2002.

(51) Int. Cl.
*G08F 11/00* (2006.01)

(52) U.S. Cl. .............. 714/5; 714/4; 718/105

(58) Field of Classification Search ........... 714/5, 714/4; 718/105; 709/205
See application file for complete search history.

(56) References Cited

U.S. PATENT DOCUMENTS

| | | | | |
|---|---|---|---|---|
| 5,025,395 | A | 6/1991 | Nose et al. | 354/518 |
| 5,581,760 | A | 12/1996 | Atkinson et al. | 395/700 |
| 5,946,686 | A | 8/1999 | Schmuck et al. | 707/10 |
| 5,956,734 | A | 9/1999 | Schmuck et al. | 707/205 |
| 5,960,446 | A | 9/1999 | Schmuck et al. | 707/205 |
| 5,987,477 | A | 11/1999 | Schmuck et al. | 707/201 |
| 6,023,706 | A | 2/2000 | Schmuck et al. | 707/200 |
| 6,128,621 | A | 10/2000 | Weisz | 707/103 |
| 6,292,905 | B1 | 9/2001 | Wallach et al. | 714/4 |
| 6,360,256 | B1* | 3/2002 | Lim | 709/223 |
| 6,438,590 | B1* | 8/2002 | Gartner et al. | 709/219 |
| 6,708,188 | B1* | 3/2004 | Bear et al. | 707/202 |
| 6,751,646 | B1* | 6/2004 | Chow et al. | 718/105 |
| 2002/0099970 | A1* | 7/2002 | Zhao et al. | 714/4 |
| 2003/0014469 | A1* | 1/2003 | Ramaswamy | 709/105 |
| 2003/0187883 | A1* | 10/2003 | Zelenka et al. | 707/201 |

OTHER PUBLICATIONS

Article by Garth A. Gibson et al. entitled "A Cost-Effective, High-Bandwidth Storage Architecture," pp. 92-103, Association for Computing Machinery, 1998.

(Continued)

*Primary Examiner*—Robert Beausoliel
*Assistant Examiner*—Christopher McCarthy
(74) *Attorney, Agent, or Firm*—Morgan, Lewis & Bockius LLP (57) ABSTRACT

A data storage methodology wherein fault tolerance is accomplished by generation of multiple canonical names for each primary manager active in the data storage system and then balancing the primary manager's failure-induced workload across the multiple backup managers using the canonical names. A qualified name for each backup manager is derived from a canonical name assigned to the primary manager. During fault-free state of operation, all the qualified names are assigned to the primary manager, which serves all its qualified names. When that primary manager fails, the work it was supporting is distributed among its backup managers using the qualified names for those backups. The distribution of primary manager's workload among multiple backups eliminates the severe performance bottlenecks present in the traditional approach of keeping one backup manager for a primary manager and keeping that backup manager idle during the fault-free state of its primary manager.

14 Claims, 3 Drawing Sheets

OTHER PUBLICATIONS

Article by Andreas Dilger & Peter J. Braam entitled "Object Based Storage HOWTO," pp. 1-13, v. 1.2, Dec. 23, 1999, available at http://www.lustre.org/docs.

Article by Garth A. Gibson and Rodney Van Meter entitled "Network Attached Storage Architecture," pp. 37-45, Communications of the ACM, Nov. 2000, vol. 43, No. 11.

Article by Leslie Lamport entitled "The Part-Time Parliament," pp. i-vi, 1-42, Digital Equipment Corporation, Sep. 1, 1989.

Article by Hui-I Hsiao and David J. DeWitt entitled "Chained Declustering: A New Availability Strategy for Multiprocessor Database Machines" (pp. 1-30).

* cited by examiner

DISTRIBUTING MANAGER FAILURE-INDUCED WORKLOAD THROUGH THE USE OF A MANAGER-NAMING SCHEME

REFERENCE TO RELATED APPLICATIONS

This application claims priority benefits of prior filed co-pending U.S. provisional patent applications Ser. No. 60/368,796, filed on Mar. 29, 2002 and Ser. No. 60/372,031, filed on Apr. 12, 2002, the disclosures of both of which are incorporated herein by reference in their entireties.

BACKGROUND

1. Field of the Invention

The present invention generally relates to data storage systems and methods, and, more particularly, to a methodology for distributing failure-induced work load among a plurality of backup managers using a canonical name-based manager-naming scheme.

2. Description of Related Art

With increasing reliance on electronic means of data communication, different models to efficiently and economically store a large amount of data have been proposed. A data storage mechanism requires not only a sufficient amount of physical disk space to store data, but various levels of fault tolerance or redundancy (depending on how critical the data is) to preserve data integrity in the event of one or more disk failures. The availability of fault-tolerance is almost mandatory in modern high-end data storage systems. One group of schemes for fault tolerant data storage includes the well-known RAID (Redundant Array of Independent Disks) levels or configurations. A number of RAID levels (e.g., RAID-0, RAID-1, RAID-3, RAID-4, RAID-5, etc.) are designed to provide fault tolerance and redundancy for different data storage applications. A data file in a RAID environment may be stored in any one of the RAID configurations depending on how critical the content of the data file is vis-à-vis how much physical disk space is affordable to provide redundancy or backup in the event of a disk failure.

Another method of fault tolerance in existing storage systems is the use of a clustering approach. In a clustering environment, two servers are bound together (i.e., electronically linked as a pair) and one server takes over the full workload of the other server should the other one fail. The "backup" server in the server pair typically does not serve data processing requests so long as the other "primary" server is operating in the fault-free state. Rather, the backup server just keeps its state up-to-date (i.e., the backup server maintains its state synchronized with the most recent state of the primary server) so that it can take over should the primary fail.

In the above described clustering approach, the available processing power on the backup server is wasted during the fault-free state because the backup server does not actively perform data processing as long as the primary server is fault free. All the backup server does in the clustering configuration is to maintain the primary server's state replicated at the backup server. The wastage of available processing power multiplies when there are a large number of primary and backup servers in a data storage system.

Therefore, it is desirable to devise a data storage technique that allows a backup server to be used as a primary server for some other portion of a data storage system, thereby making use of that backup server's available processing power. It is further desirable to implement the backup server-based fault tolerance in a multi-server object based data storage environment.

SUMMARY

In one embodiment, the present invention contemplates a method of distributing failure-induced workload in an object-based data storage system. The method comprises selecting a plurality of managers to serve as backup managers for a primary manager in the data storage system, wherein the primary manager and each of the plurality of managers manage data storage operations for respective portions of the data storage system during a fault-free state of the primary manager; assigning a canonical name to the primary manager; generating a plurality of qualified names from the canonical name, wherein each of the plurality of qualified names is assigned to a respective one of the plurality of backup managers; configuring the primary manager to serve each of the plurality of qualified names during the fault-free state thereof; and upon failure of the primary manager, distributing a respective portion of workload of the primary manager to each corresponding one of the plurality of backup managers using the plurality of qualified names.

Using the manager-naming scheme according to the present invention, fault tolerance is accomplished by generation of multiple canonical names for each primary manager active in the data storage system and then balancing the primary manager's failure-induced workload across the multiple backup managers using the canonical names. The problem of distributing failure-induced workload is solved by identifying an appropriate backup manager through the use of a qualified canonical name. The qualified name for each backup manager is derived from a canonical name assigned to the primary manager. During normal (i.e., fault-free) state of operation, all the qualified names (for backup managers) are assigned to the primary manager, which serves all its qualified names. Thus, the primary manager is assigned more than one canonical name during normal operation. When that primary manager fails, the work it was supporting is distributed among its backup managers using the qualified names for those backups.

The distribution of primary manager's workload among multiple backups eliminates the severe performance bottlenecks present in the traditional approach of keeping one backup manager for a primary manager and keeping that backup manager idle during the fault-free state of its primary manager. Further, as the identity of the manager responsible for an object is kept with the object itself (i.e., as part of the object's attributes in the object's directory entry), the distribution of failure-induced workload and load balancing during normal operation are facilitated using such a simple manager naming scheme.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical data storage systems or networks.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

Figure 1:
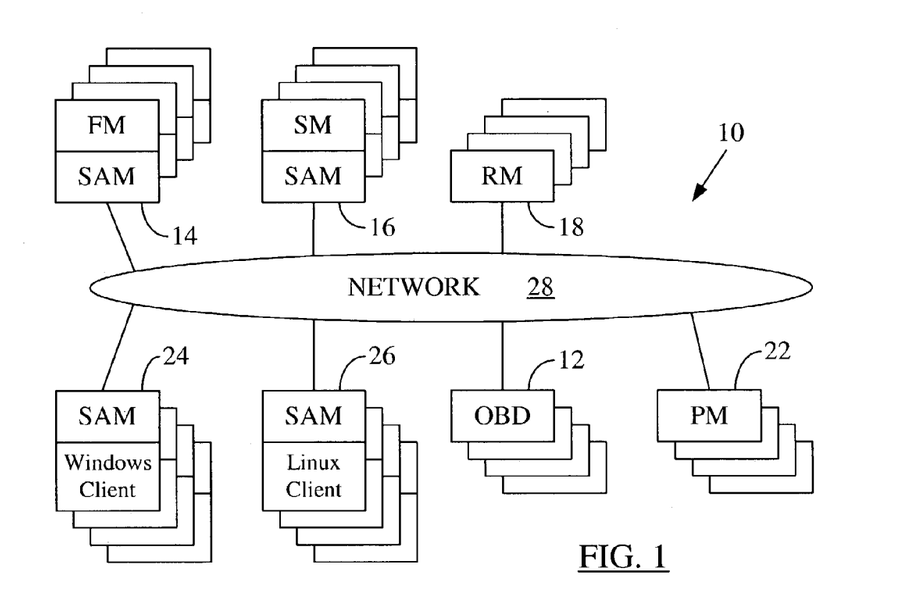
FIG. 1 illustrates an exemplary network-based file storage system designed around Object Based Secure Disks (OBSDs or OBDs)

FIG. 1 illustrates an exemplary network-based file storage system 10 designed around Object Based Secure Disks (OBSDs or OBDs) 12. The file storage system 10 is implemented via a combination of hardware and software units and generally consists of managers 14, 16, 18, and 22, OBDs 12, and clients 24, 26. It is noted that FIG. 1 illustrates multiple clients, OBDs, and managers—i.e., the network entities—operating in the network environment. However, for the ease of discussion, a single reference numeral is used to refer to such entity either individually or collectively depending on the context of reference. For example, the reference numeral "12" is used to refer to just one OBD or a group of OBDs depending on the context of discussion. Similarly, the reference numerals 14–22 for various managers are used interchangeably to also refer to respective servers for those managers. For example, the reference numeral "14" is used to interchangeably refer to the software file managers (FM) and also to their respective servers depending on the context. It is noted that each manager is an application program code or software running on a corresponding server. The server functionality may be implemented with a combination of hardware and operating software. For example, each server in FIG. 1 may be a Windows NT® server. Thus, the file system 10 in FIG. 1 is an object-based distributed data storage system implemented in a client-server configuration.

The network 28 may be a LAN (Local Area Network), WAN (Wide Area Network), MAN (Metropolitan Area Network), SAN (Storage Area Network), wireless LAN, or any other suitable data communication network including a TCP/IP (Transmission Control Protocol/Internet Protocol) based network (e.g., the Internet). A client 24, 26 may be any computer (e.g., a personal computer or a workstation) electrically attached to the network 28 and running appropriate operating system software as well as client application software designed for the system 10. FIG. 1 illustrates a group of clients or client computers 24 running on Microsoft Windows® operating system, whereas another group of clients 26 is running on the Linux® operating system. The clients 24, 26 thus present an operating system-integrated file system interface. The semantics of the host operating system (e.g., Windows®, Linux®, etc.) may preferably be maintained by the file system clients.

The manager (or server) and client portions of the program code may be written in C, C++, or in any other compiled or interpreted language suitably selected. The client and manager software modules may be designed using standard software tools including, for example, compilers, linkers, assemblers, loaders, bug tracking systems, memory debugging systems, etc.

FIG. 1 shows a number of OBDs 12 attached to the network 28. An OBSD or OBD 12 is a physical disk drive that stores data files in the network-based system 10 and may have the following properties: (1) it presents an object-oriented interface rather than a sector-based interface (wherein each "block" on a disk contains a number of data "sectors") as is available with traditional magnetic or optical data storage disks (e.g., a typical computer hard drive); (2) it attaches to a network (e.g., the network 28) rather than to a data bus or a backplane (i.e., the OBDs 12 may be considered as first-class network citizens); and (3) it enforces a security model to prevent unauthorized access to data stored thereon.

The fundamental abstraction exported by an OBD 12 is that of an "object," which may be defined as a variably-sized ordered collection of bits. Contrary to the prior art block-based storage disks, OBDs do not export a sector interface (which guides the storage disk head to read or write a particular sector on the disk) at all during normal operation. Objects on an OBD can be created, removed, written, read, appended to, etc. OBDs do not make any information about particular disk geometry visible, and implement all layout optimizations internally, utilizing lower-level information than can be provided through an OBD's direct interface with the network 28. In one embodiment, each data file and each file directory in the file system 10 are stored using one or more OBD objects.

In a traditional networked storage system, a data storage device, such as a hard disk, is associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client.

On the other hand, in the system 10 illustrated in FIG. 1, each OBD 12 communicates directly with clients 24, 26 on the network 28, possibly through routers and/or bridges. The OBDs, clients, managers, etc., may be considered as "nodes" on the network 28. In system 10, no assumption needs to be made about the network topology (as noted hereinbefore) except that each node should be able to contact every other node in the system. The servers (e.g., servers 14, 16, 18, etc.) in the network 28 merely enable and facilitate data transfers between clients and OBDs, but the servers do not normally implement such transfers.

In one embodiment, the OBDs 12 themselves support a security model that allows for privacy (i.e., assurance that data cannot be eavesdropped while in flight between a client and an OBD), authenticity (i.e., assurance of the identity of the sender of a command), and integrity (i.e., assurance that in-flight data cannot be tampered with). This security model may be capability-based. A manager grants a client the right to access the data storage (in one or more OBDs) by issuing to it a "capability." Thus, a capability is a token that can be granted to a client by a manager and then presented to an OBD to authorize service. Clients may not create their own capabilities (this can be assured by using known cryptographic techniques), but rather receive them from managers and pass them along to the OBDs. In one embodiment, a manager (e.g., a file manager 14) may also contact another manager (e.g., another file manager) for a capability for some specialized operations.

A capability is simply a description of allowed operations. A capability may be a set of bits (1's and 0's) placed in a predetermined order. The bit configuration for a capability may specify the operations for which that capability is valid. Thus, there may be a "read capability," a "write capability," etc. Every command sent to an OBD may need to be accompanied by a valid capability of the appropriate type. A manager may produce a capability and then digitally sign it using a cryptographic key that is known to both the manager and the appropriate OBD, but unknown to the client. The client will submit the capability with its command to the OBD, which can then verify the signature using its copy of the key, and thereby confirm that the capability came from an authorized manager (one who knows the key) and that it has not been tampered with in flight. An OBD may itself use cryptographic techniques to confirm the validity of a capability and reject all commands that fail security checks. Thus, capabilities may be cryptographically "sealed" using "keys" known only to one or more of the managers 14–22 and the OBDs 12.

Logically speaking, various system "agents" (i.e., the clients 24, 26, the managers 14–22 and the OBDs 12) are independently-operating network entities. Day-to-day services related to individual files and directories are provided by file managers (FM) 14. The file manager 14 is responsible for all file- and directory-specific states. The file manager 14 creates, deletes and sets attributes on entities (i.e., files or directories) on clients' behalf. When clients want to access other entities on the network 28, the file manager performs the semantic portion of the security work—i.e., authenticating the requestor and authorizing the access—and issuing capabilities to the clients. File managers 14 may be configured singly (i.e., having a single point of failure) or in failover configurations (e.g., machine B tracking machine A's state and if machine A fails, then taking over the administration of machine A's responsibilities until machine A is restored to service).

The primary responsibility of a storage manager (SM) 16 is the aggregation of OBDs for performance and fault tolerance. A system administrator (e.g., a human operator or software) may choose any layout or aggregation scheme for a particular object. The SM 16 may also serve capabilities allowing clients to perform their own I/O to aggregate objects (which allows a direct flow of data between an OBD and a client). The storage manager 16 may also determine exactly how each object will be laid out—i.e., on what OBD or OBDs that object will be stored, whether the object will be mirrored, striped, parity-protected, etc. This distinguishes a "virtual object" from a "physical object". One virtual object (e.g., a file or a directory object) may be spanned over, for example, three physical objects (i.e., OBDs).

The installation of the manager and client software to interact with OBDs 12 and perform object-based data storage in the file system 10 may be called a "realm." The realm may vary in size, and the managers and client software may be designed to scale to the desired installation size (large or small). A realm manager 18 is responsible for all realm-global states. That is, all states that are global to a realm state are tracked by realm managers 18. A realm manager 18 maintains global parameters, notions of what other managers are operating or have failed, and provides support for up/down state transitions for other managers. Realm managers 18 keep such information as realm-wide file system configuration, and the identity of the file manager 14 responsible for the root of the realm's file namespace. A state kept by a realm manager may be replicated across all realm managers in the system 10 (an example of which is discussed below with reference to FIG. 3), and may be retrieved by querying any one of those realm managers 18 at any time. Updates to such a state may only proceed when all realm managers that are currently functional agree. The replication of a realm manager's state across all realm managers allows making realm infrastructure services arbitrarily fault tolerant—i.e., any service can be replicated across multiple machines to avoid downtime due to machine crashes. In one embodiment, the program codes for various managers shown in FIG. 1 can communicate with one another whenever needed.

The storage access module (SAM) is a program code module that may be compiled into the managers as well as the clients. The SAM generates and sequences the OBD-level operations necessary to implement system-level I/O operations, for both simple and aggregate objects. A performance manager (PM) 22 may run on a server that is physically separate from the servers for other managers (as shown, for example, in FIG. 1) and may be responsible for monitoring the performance of the file system realm and for tuning the locations of objects in the system to improve performance. The performance manager 22 can be directly manipulated through command-line tools, allowing the system administrator to manually reconfigure the realm.

A further discussion of various managers shown in FIG. 1 and the interaction among them is provided on pages 11–15 in the co-pending, commonly-owned U.S. patent application Ser. No. 10/109,998, filed on Mar. 29, 2002, titled "Data File Migration from a Mirrored RAID to a Non-Mirrored XOR-Based RAID Without Rewriting the Data", whose disclosure at pages 11–15 is incorporated by reference herein in its entirety.

The realm manager 18 identifies which managers in a network contain the location information for any particular data set. The realm manager assigns a primary manager (from the group of other managers in the system 10) which is responsible for identifying all such mapping needs for each data set. The realm manager also assigns one or more backup managers (also from the group of other managers in the system) that also track and retain the location information for each corresponding data set. Thus, upon failure of a primary manager, the realm manager 18 may instruct the client 24, 26 to find the location data for a data set through a backup manager. The present invention discusses one method of providing backup functionality using canonical naming as described in more detail hereinbelow.

Thus, a benefit of the present system is that the location information describing at what data storage device (i.e., an OBD) or devices 12 the desired data is stored may be located at a plurality of processors (i.e., realm managers) in the network. Therefore, a client 24, 26 need only identify one of a plurality of manager processors containing access information for the desired data to be able to access that data. The client can then directly retrieve data from the data storage device without passing data through any manager.

The fact that clients directly access OBDs, rather than going through a server, makes I/O operations in the object-based file system 10 different from other file systems. In one embodiment, prior to accessing any data or metadata, a client must obtain (1) the identity of the OBD on which the data resides and the object number within that OBD, and (2)

a capability valid on that OBD allowing the access. Clients learn of the location of objects by directly reading and parsing directory objects located on the OBD(s) identified. Clients obtain capabilities by sending explicit requests to file managers 14. The client includes with each such request its authentication information as provided by the local authentication system. The file manager 14 may perform a number of checks (e.g., whether the client is permitted to access the OBD, whether the client has previously misbehaved or "abused" the system, etc.) prior to granting capabilities. If the checks are successful, the FM 14 may grant requested capabilities to the client, which can then directly access the OBD in question or a portion thereof.

Figure 2:
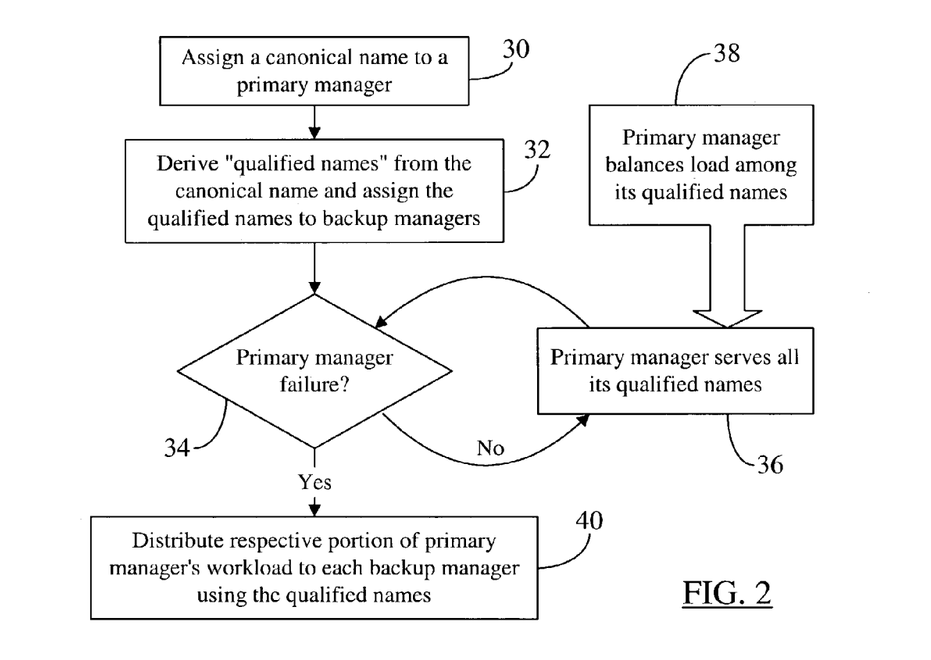
FIG. 2 is an exemplary flowchart illustrating how a primary manager's workload is handled upon the primary manager's failure according to the present invention.

FIG. 2 is an exemplary flowchart illustrating how a primary manager's workload is handled upon the primary manager's failure according to the present invention. As noted before, the present invention focuses on allowing a backup server to be used as a primary server for some other portion of the storage network (e.g., the network 28), thereby making use of the backup server's processing power during the fault-free operation of the primary server. In the embodiment discussed with reference to FIG. 2, there are more than one backup servers or managers for each primary server or manager. For example, one of the storage managers 16 may be a primary manager for a portion of the storage network 28 whereas three other storage managers (in the group of storage managers 16) may be selected to function as that primary manager's backup managers for that portion of the storage network 28. It is noted that the terms "primary manager" and "backup managers" may include similar managers from any group of managers (e.g., group of file managers 14, group of storage managers 16, etc.) shown in FIG. 1 so long as the backup functionality is implemented for that group of managers.

At the time a new primary manager (which could be a file manager 14, a storage manager 16, etc.) is brought into use in the system 10, a master realm manager 18 selects "N" number of other similar managers to serve as backup managers for the new primary manager. For example, for a primary file manager 14, there may be five (N=5) backup file managers over the network 28. The realm managers 18 operate with quorum/consensus to elect one of them to function as a master realm manager that is responsible to coordinate system-wide backup functionality and manager failure-induced load balancing in the realm. The master realm manager (RM) may assign responsibility to various primary and backup managers. The master RM may make the initial decision as to which "N" other managers (from the entire set of similar managers available) should be used to backup the new primary manager based on the topology of the network 28 (e.g., to minimize messaging time between the primary and backup managers when the backups keep their states updated to replicate the state of the primary) and on the average observed load on each of the other managers suitable to serve as backups. In one embodiment, all the realm managers 18 in the system 10 use the well-known Distributed Consensus Algorithm to elect a master realm manager from among themselves as discussed in more detail in the co-pending, commonly-owned U.S. patent application Ser. No. 60/372,039, filed on Apr. 12/2002, titled "Hybrid Quorum/Master-Backup Fault-Tolerance Model", whose disclosure is incorporated by reference herein in its entirety.

The master RM 18 may assign a canonical name to the new primary manager as indicated at block 30 in FIG. 2. The term "canonical name," as used herein, may refer to an abstract name assigned to a large group of files managed by a manager having a physical ID. Manager physical ID's are discussed below with reference to FIG. 3. Thus, a canonical name identifies which hardware device or manager is managing the associated set of files in the object-based distributed data storage system 10. For example, a primary manager may be given the canonical name "rocky." From this canonical name, the master RM may derive N "qualified names" in the form of <rocky,1>, <rocky,2>, . . . , <rocky,N> and assign one qualified name to each of the corresponding N backup managers selected to serve as backups for the primary manager (block 32, FIG. 2). Thus, each backup manager is assigned a different qualified name from the set of "N" qualified names derived from the primary manager's canonical name. It is noted that, in one embodiment, the number "N" may be predetermined. In another embodiment, however, the number "N" may not be constant over time nor over the entire system. In that embodiment, the qualified names may be created, deleted and merged dynamically at run time.

Figure 3:
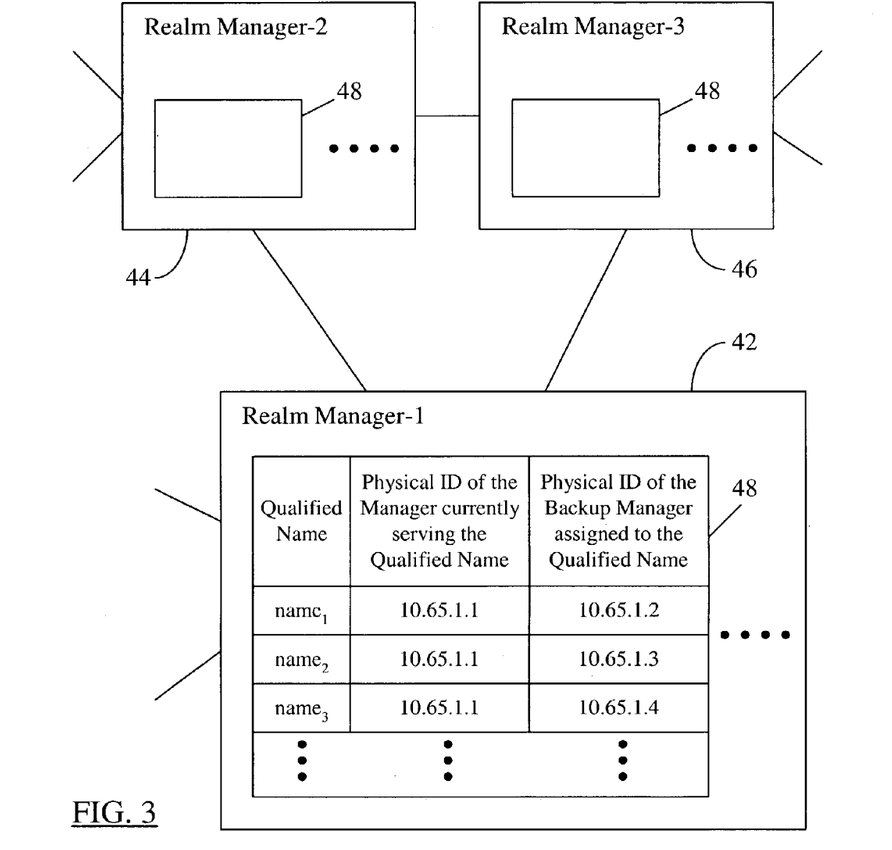
FIG. 3 shows an exemplary qualified name mapping table replicated across a group of realm managers in the storage system of FIG. 1.

FIG. 3 shows an exemplary qualified name mapping table 48 replicated across a group of realm managers 42, 44, 46 in the storage system 10 of FIG. 1. It is understood that although only three realm managers 42–46 are shown in FIG. 3 from the group of realm managers 18 in FIG. 1, the mapping table 48 is replicated across all the realm managers 18 in the system 10. It is noted that numerals 42–46 are used to identify realm managers for ease of reference only; the realm managers 42–46 are a part of the realm managers 18 in the system 10. In the embodiment shown in FIG. 3, the realm managers operate using the quorum/consensus algorithm (as discussed hereinbefore) and, hence, the realm managers 42–46 are shown connected with one another and also with other realm managers 18 in the system 10. The realm manager 42 may be considered the master RM for ease of discussion. Further, each realm manager 18 in the system 10 may store a number of mapping tables (one for each primary manager) as indicated by dots in FIG. 3. Also, there may be more than three qualified names in the mapping table 48 as indicated by dots in the table 48. The number of entries in table 48 for qualified names equals the number ("N") of backup managers for the primary manager. Thus, the mapping table 48 is shown for illustrative purpose only, and is not meant to be a comprehensive depiction of realm manager storage layouts in the system 10 of FIG. 1.

As shown in the embodiment of FIG. 3, the mapping table 48 contains a list of all qualified names for a particular primary manager, the physical ID of the manager currently serving the respective qualified name (here, the primary manager), and the physical ID of the backup manager assigned to that qualified name. For example, in the mapping table 48, the physical ID of the primary manager is "10.65.1.1", whereas the physical ID's of various backup managers for that primary manager are "10.65.1.2", "10.65.1.3", "10.65.1.4", etc. Further, the backup manager with physical ID "10.65.1.2" is assigned to the qualified name "$name_1$" (e.g., <rocky,1>), the backup manager with physical ID "10.65.1.3" is assigned to the qualified name "$name_2$" (e.g., <rocky,2>), etc. It is understood the physical ID's in table 48 are for illustrative purpose only. A physical ID may depend on the device numbering protocol implemented in the system 10. In one embodiment, all the managers, clients and storage devices in the system 10 may be assigned physical ID's using an addressing scheme similar to the IP (Internet Protocol) addressing for the Internet. Furthermore, it is noted that the column headings in the mapping table 48 are also for illustrative purpose only. In real storage, the realm managers may just store the abstract qualified names and associated physical ID's, and appropriately link each qualified name with its corresponding associated physical ID's.

Thus, the realm managers 18 keep a fully-distributed database of the current mappings of qualified names to physical manager computers. In one embodiment, any of these mappings is updated only via a quorum/consensus algorithm mentioned hereinbefore. When a client 24, 26 wishes to access an object, it contacts its associated RM to request a translation from the qualified name to the network address of the computer that is currently serving as the primary manager for that name. The RM approached by the client supplies the requested information from the corresponding mapping table 48 stored therein, and the client caches the received information (including the physical ID of the current primary manager) to minimize future RM communication.

So long as the primary manager operates in the fault-free condition (block 34, FIG. 2), only the primary manager serves all its qualified canonical names (block 36, FIG. 2) as depicted by the middle column in the mapping table 48 in FIG. 3. Thus, in the example of the primary manager with "rocky" canonical name, the primary manager continues to serve its qualified names <rocky,1>, <rocky,2>, . . . , <rocky,N>, and attempts to load balance across its qualified names (block 38, FIG. 2) so long as the primary manager remains fault-free. The primary manager also maintains a replication of its internal state at respective backup managers. In one embodiment, the load balancing is performed internally by the primary manager itself using one of the many available approaches. For example, the load balancing may be static, i.e., the primary manager tries to keep constant the number of objects (or files) assigned to each of its qualified canonical names. Alternatively, the load balancing may be dynamic, i.e., the primary manager dynamically (i.e., during run time) observes its own workload and tries to keep constant the total number of I/O requests per second to each qualified name (i.e., to the objects or files associated with each qualified name).

Figure 4:
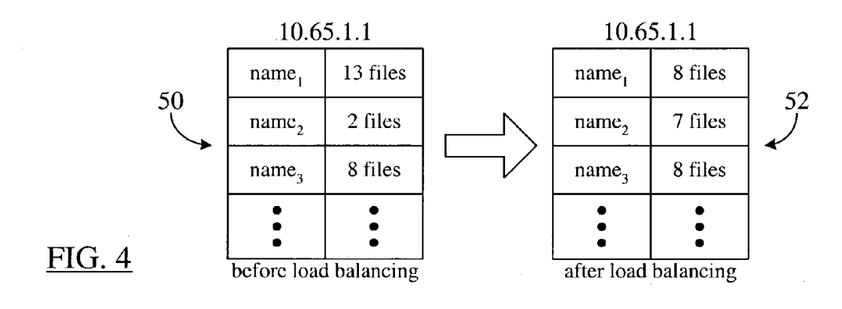
FIG. 4 depicts how a primary manager balances its workload among its qualified names.

FIG. 4 depicts how a primary manager balances its workload among its qualified names over time. In the example shown in FIG. 4, initially (i.e., prior to load balancing) the primary manager (with physical ID=10.65.1.1) is managing data operations for 23 file objects as indicated in table 50. These file objects are unevenly assigned to three different qualified names as shown in table 50. Over time, the primary manager may internally shuffle its file load to symmetrically balance the load among the qualified names "owned" by the primary manager. In FIG. 4, after load balancing, the files may be distributed as shown in table 52. Thus, each qualified name in table 52 gets assigned almost the same number of files after the primary manager performs load balancing. It is noted that the symmetrical distribution illustrated in FIG. 4 is just one approach for load balancing. If one or more files in the files to be distributed are too large in size, then more smaller files may be assigned to one qualified name and the other qualified name may have just a couple of large file objects. In that situation, the load distribution may not be symmetrical at all. Thus, the primary manager actively monitors the observed workload to each of its qualified canonical names, and attempts to load balance heuristically over a long period of time. On the other hand, some prior art techniques use a static assignment of managed objects (i.e., workload) to backup managers.

As new objects are created on the primary manager and old objects are migrated by the primary manager during load balancing, each object handled by the primary manager is assigned to one of its qualified canonical names as discussed hereinbefore. In one embodiment, an object's qualified canonical name is stored with the directory entry (on an OBD) for that object, thereby allowing identification of the manager responsible for the object (e.g., in the event of primary manager's failure).

In one embodiment, the primary manager may use a simple protocol to change (e.g., during load balancing) the qualified name associated with a storage object. As part of that protocol, the primary manager may initially "lock" the file object whose associated qualified name is to be changed. Locking the file object prevents clients or other managers in the system to access the file object and write to it. It is noted that each file object stored on an OBD has a set of attributes stored along with the object. The attributes for an object may include such information as that object's numerical ID (a randomly generated number to identify the object), the identity of the OBD storing the object, the identity of file or storage managers (including any backups) managing that object, etc. After locking the file object, the primary manager accesses the OBD storing the object in question and updates the file object's attributes to reflect the new qualified name associated with that object. Thereafter, the primary manager "unlocks" or "releases" the file object to allow clients and other mangers to access it. Thus, the primary manager performs two functions as part of its load balancing task: (1) it decides to initiate load balancing, and (2) it itself performs the load balancing. In one embodiment, the primary manager also updates its internal file counters to keep track of load balancing when objects are shuffled from one qualified name to another.

When the primary manager fails (block 34, FIG. 2), the realm managers 18 authorize a fail-over event using the quorum/consensus algorithm as described in more detail in the co-pending, commonly-owned U.S. patent application titled "Hybrid Quorum/Master-Backup Fault-Tolerance Model" mentioned before. The disclosure of this patent application is incorporated by reference herein in its entirety. In response to the fail-over event notification from the master RM, all the realm managers (including the master RM) update their internal databases (which are replicated across all realm managers) to change the identity of the manager serving a particular qualified name from the primary manager to its appropriate backup manager.

Figure 5:
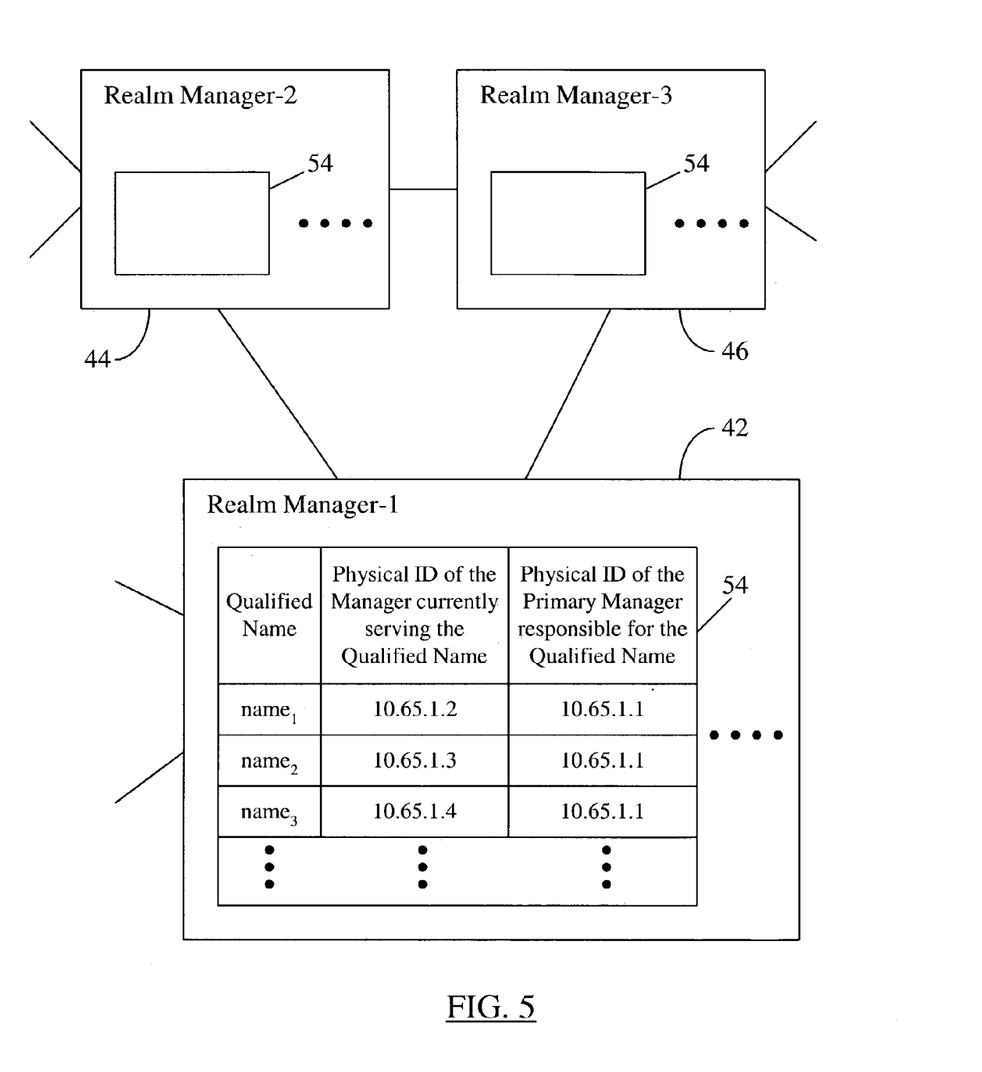
FIG. 5 illustrates an arrangement similar to that shown in FIG. 3, but with an updated qualified name mapping table after primary manager's failure.

FIG. 5 illustrates an arrangement similar to that shown in FIG. 3, but with an updated qualified name mapping table 54 after primary manager's failure. As shown in FIG. 5, after the primary manager's failure, the realm managers assign the qualified names to respective backup managers (as indicated in the middle column in the table 54). These backup managers then actively manage corresponding qualified names until the primary manager is functional again. The backup managers are able to provide their share of the primary manager's functionality because of the on-going replication by the primary manager of is state at the backup managers until the primary manager's failure. That is, the backup managers maintain the most up-to-date state of the primary manager just before primary's failure to allow them to take over primary manager's functionality.

After primary manager's failure, when a client 24, 26 first attempts to contact the primary manager for an object, the client's attempt fails because the primary manager is down. In that event, the client re-contacts its associated realm manager to get a new translation and the realm manager, in turns, informs the client of the identity of the new backup manager currently serving the qualified name associated with the object in question. When the primary manager recovers from failure, it resynchronizes its state with its backup managers, and then the realm managers again authorize another fail-over event (using quorum/consensus algorithm described before) to re-assign qualified names back to the original primary manager. In that event, after manager reassignment, the qualified name mapping table may again look similar to that shown in FIG. 3.

It is noted that various managers (e.g., file managers 14, storage managers 16, etc.) shown and described with reference to FIG. 1, the program code implemented to operate the system 10 in FIG. 1, and the program code for performing the manager naming according to an embodiment of the present invention may reside on a computer-readable, tangible storage medium (e.g., a compact disc, an optical disc, a magnetic storage medium such as a computer hard drive ,etc.) allowing ease of software portability and system management. The program code on the storage medium can be executed by a computer system processor and upon execution, the program code may cause the processor to perform various operations described hereinabove with reference to individual components (e.g., managers) constituting the program code. Similarly, a client application (e.g., any of the client applications 24, 26 in FIG. 1) can also be stored on a computer-readable data storage medium and executed therefrom.

The foregoing describes a data storage methodology wherein fault tolerance is accomplished by generation of multiple canonical names for each primary manager active in the data storage system and then balancing the primary manager's failure-induced workload across the multiple backup managers using the canonical names. With the simple manager naming scheme of the present invention, the problem of distributing failure-induced workload is solved by identifying an appropriate backup manager through the use of a qualified canonical name. The qualified name for each backup manager is derived from a canonical name assigned to the primary manager. During normal (i.e., fault-free) state of operation, all the qualified names (for backup managers) are assigned to the primary manager, which serves all its qualified names. Thus, the primary manager is assigned more than one canonical name during normal operation. When that primary manager fails, the work it was supporting is distributed among its backup managers using the qualified names for those backups. The distribution of primary manager's workload among multiple backups eliminates the severe performance bottlenecks present in the traditional approach of keeping one backup manager for a primary manager and keeping that backup manager idle during the fault-free state of its primary manager. Further, as the identity of the manager responsible for an object is kept with the object itself (i.e., as part of the object's attributes in the object's directory entry), the distribution of failure-induced workload and load balancing during normal operation are facilitated using such a simple manager naming scheme.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. A method of distributing failure-induced workload in an object-based data storage system comprising:
   selecting a plurality of managers to serve as backup managers for a primary manager in said data storage system, wherein said primary manager and each of said plurality of managers manage data storage operations for respective portions of said data storage system during a fault-free state of said primary manager;
   assigning a canonical name to said primary manager;
   generating a plurality of qualified names from said canonical name, wherein each of said plurality of qualified names is assigned to a respective one of said plurality of backup managers;
   configuring said primary manager to serve each of said plurality of qualified names during said fault-free state thereof; and
   upon failure of said primary manager, distributing a respective portion of workload of said primary manager to each corresponding one of said plurality of backup managers using said plurality of qualified names.

2. The method of claim 1, further comprising maintaining a database containing the following information for each qualified name:
   a first information indicating the name of each said qualified name;
   a second information identifying said primary manager for each said qualified name; and
   a third information identifying a corresponding one of said plurality of backup managers associated with each said qualified name.

3. The method of claim 2, wherein maintaining said database includes replicating said database among a plurality of realm managers in said data storage system, wherein each of said plurality of realm managers maintains a record representing a storage configuration of a portion of said data storage system.

4. The method of claim 1, further comprising maintaining a database containing the following information for each qualified name:
   a first information indicating the name of each said qualified name; and
   a second information linking each said qualified name with said primary manager and a corresponding one of said plurality of backup managers.

5. The method of claim 1, wherein selecting said plurality of managers as backup managers includes selecting said plurality of managers using at least one of the following considerations:
   minimization of messaging time between said primary manager and each one of said plurality of backup managers; and
   average observed load on each of said plurality of backup managers.

6. The method of claim 1, wherein a corresponding number of managers in said plurality of managers is identical for each primary manager in said data storage system.

7. The method of claim 1, wherein the number of managers in said plurality of managers is predetermined.

8. The method of claim 1, wherein a corresponding number of managers in said plurality of managers is different for two or more primary managers in said data storage system.

9. The method of claim 1, wherein configuring said primary manager to serve each of said plurality of qualified names includes configuring said primary manager to assign each object managed thereby to a corresponding one of said plurality of qualified names.

10. The method of claim 9, wherein configuring said primary manager to assign each said object includes configuring said primary manager to assign each said object in one of the following ways:
   a static way, wherein a corresponding number of objects assigned to each of said plurality of qualified names is constant; and
   a dynamic way, wherein said corresponding number of objects assigned to each of said plurality of qualified names is variable.

11. The method of claim 1, wherein configuring said primary manager to serve each of said plurality of qualified names includes configuring said primary manager to distribute a load thereof among said plurality of qualified names.

12. The method of claim 1, further comprising storing an identity of a server manager for an object in said data storage system in a directory entry for said object, wherein said server manager is one of the following:
   said primary manager; and
   one of said plurality of backup managers whose qualified name has said object assigned thereto.

13. A computer-readable storage medium containing a program code, which, upon execution by a processor in an object-based distributed data storage system, causes said processor to perform the following:
   select a plurality of managers to serve as backup managers for a primary manager in said data storage system, wherein said primary manager and each of said plurality of managers manage data storage operations for respective portions of said data storage system during a fault-free state of said primary manager;
   assign a canonical name to said primary manager;
   generate a plurality of qualified names from said canonical name, wherein each of said plurality of qualified names is assigned to a respective one of said plurality of backup managers;
   configure said primary manager to serve each of said plurality of qualified names during said fault-free state thereof; and
   upon failure of said primary manager, distribute a respective portion of workload of said primary manager to each corresponding one of said plurality of backup managers using said plurality of qualified names.

14. An object-based data storage system comprising:
   means for selecting a plurality of managers to serve as backup managers for a primary manager in said data storage system, wherein said primary manager and each of said plurality of managers manage data storage operations for respective portions of said data storage system during a fault-free state of said primary manager;
   means for assigning a canonical name to said primary manager;
   means for generating a plurality of qualified names from said canonical name,
      wherein each of said plurality of qualified names is assigned to a respective one of said plurality of backup managers;
   means for configuring said primary manager to serve each of said plurality of qualified names during said fault-free state thereof; and
   upon failure of said primary manager, means for distributing a respective portion of workload of said primary manager to each corresponding one of said plurality of backup managers using said plurality of qualified names.

* * * * *